United States Patent [19]

Majmudar et al.

[11] Patent Number: 4,897,866
[45] Date of Patent: Jan. 30, 1990

[54] TELECOMMUNICATION SYSTEM WITH SUBSCRIBER CONTROLLED FEATURE MODIFICATION

[75] Inventors: Bhairav A. Majmudar, Iselin; Vinh T. Vu, Middletown, both of N.J.

[73] Assignee: American Telephone and Telegraph Company, AT&T Bell Laboratories, Murray Hill, N.J.

[21] Appl. No.: 259,939

[22] Filed: Oct. 19, 1988

[51] Int. Cl.⁴ ...................... H04M 3/42; H04M 11/00
[52] U.S. Cl. ........................................ 379/94; 379/96; 379/201; 379/396
[58] Field of Search ...................... 379/93, 94, 96, 90, 379/201, 157, 368, 396; 455/4, 5

[56] References Cited

U.S. PATENT DOCUMENTS

| 4,291,198 | 9/1981 | Anderson et al. | 379/96 |
| 4,741,026 | 4/1988 | Baxter et al. | 379/204 |
| 4,748,656 | 5/1988 | Gibbs et al. | 379/93 |

OTHER PUBLICATIONS

Bloedon, R. et al., "Touchphone: A New Generation in Phone Design", *Telesis*, 1985, pp. 20-25.
Hsing, T. et al., "An Interactive Touch Phone for Office Automation", *IEEE Communications*, vol. 23, No. 2, 2/85, pp 21-26.
Bayer, D. et al., "An Experimental Teletermina-The Software Stragtegy", *Bell System Tech. Journal*, vol. 62, No. 1, 1/83, pp. 121-144.
Hagelbarger, R. et al., (Same as T above), pp. 145-153.

*Telephony*, Jul. 14, 1986, J. Ferguson, "Ergonomic Design of Intelligent Phones", pp. 77, 81.
*AT&T Technical Description*, CIR 190-099-040TD, Issue 2, Dec., 1987, "MacStar ® II End Customer Management System Generic 2MAC2".

*Primary Examiner*—Jin F. Ng
*Assistant Examiner*—Bonita F. Lewis
*Attorney, Agent, or Firm*—Peter Visserman

[57] ABSTRACT

An arrangement for allowing a subscriber to select telephone features from the subscriber terminal is disclosed. The subscriber terminal includes a touch screen display and a customer premises computer. The terminal in response to a touching of the appropriate area of the screen, displays a list of all possible telephone features available to this subscriber terminal together with an indication of currently subscribed features. By touching the screen in the appropriate areas, the subscriber may select features to be added or deleted. The information regarding the subscriber selection is transmitted to the central office to which the terminal is connected. The central office maintains a set of software packages corresponding to each of the possible combinations of features to be selected by a subscriber and in response to information from the terminal defining a new set of features, the central office transmits the appropriate software package to the terminal. From then on, the terminal is reconfigured to provide the newly selected set of features. The software package includes screen display software showing feature function buttons which indicate the current set of features when the terminal is activated.

14 Claims, 3 Drawing Sheets

TELECOMMUNICATION SYSTEM WITH SUBSCRIBER CONTROLLED FEATURE MODIFICATION

BACKGROUND OF THE INVENTION

The invention relates to telecommunication systems, and more particularly, to an arrangement allowing subscriber telephone feature modification from a subscriber terminal.

DESCRIPTION OF THE PRIOR ART

Telephone subscriber terminals for modern business systems may be equipped with a number of feature buttons e.g., conference, auto callback, etc. in addition to a key pad. A variety of different functions may be required of a telephone set, depending upon its use. In a business office, for example, a secretary's set usually has different features than an executive. Furthermore, a user's need for features changes from time to time. In order to accommodate the various needs, terminal manufacturers market telephone sets for different needs. For example, there are sets for executives and other sets for secretaries. Manufacturing different types of sets, however, tends to be uneconomical.

Some telephone systems, particularly of the type referred to as Integrated Services Digital Network (ISDN) systems allow the reassignment of the buttons of a telephone terminal from time to time. Such reassignment is accomplished by means of a service order which usually involves transmittal of forms to the telephone services provider, e.g., a local telephone company, and a modification of the telephone switching system or the terminal or both. Service modification by service order is often accompanied by a delay of several days or weeks.

It is an object of this invention to provide for a convenient modification of subscriber features under control of the subscriber.

SUMMARY OF THE INVENTION

In accordance with this invention, a message requesting specific subscriber features can be sent from a subscriber terminal to the switching system which responds by transmitting data to the terminal to control the terminal to execute terminal functions associated with the selected feature set. In one embodiment of the invention, a terminal software package reflecting the selected features is transmitted from the switching system to the subscriber terminal. In accordance with one aspect of the invention, the subscriber terminal includes a video display screen which displays a configuration of feature buttons as defined by the program and is responsive to a change of program to display another configuration of feature buttons. In accordance with another aspect of the invention, the video display screen is a touch screen and the terminal is responsive to a touching action by a user to transmit information to the switching system defining the feature displayed on the touched area of the screen. Advantageously, in the arrangement in accordance with the present invention, there is no need to inform the switching system of the features represented by the terminal feature buttons since the messages transmitted by the terminal to the switching system in response to a touching, define the desired actions.

In one specific embodiment of the invention, the terminal includes means for sending a change of feature select message to the switching system and the terminal displays a panel listing features available to the subscriber. The subscriber may select specific features by keying a message or touching an appropriate area of the touch screen to select the combination of features desired. The terminal will transmit appropriate messages defining the selected features to the switch, and the switch in turn will transmit to the terminal a new program which defines the selected feature set. Accordingly, on subsequent activation the terminal will display a new set of feature buttons to the user in accordance with the selected features.

Advantageously, a terminal in accordance with this invention, has the flexibility to be compatible with any number of desired subscriber features and only one terminal type is required for any number of different features or different functions to be defined for the terminal.

BRIEF DESCRIPTION OF THE DRAWING

The invention may be better understood from the following detailed description when read with reference to the drawing in which.

DETAILED DESCRIPTION

Figure 1:
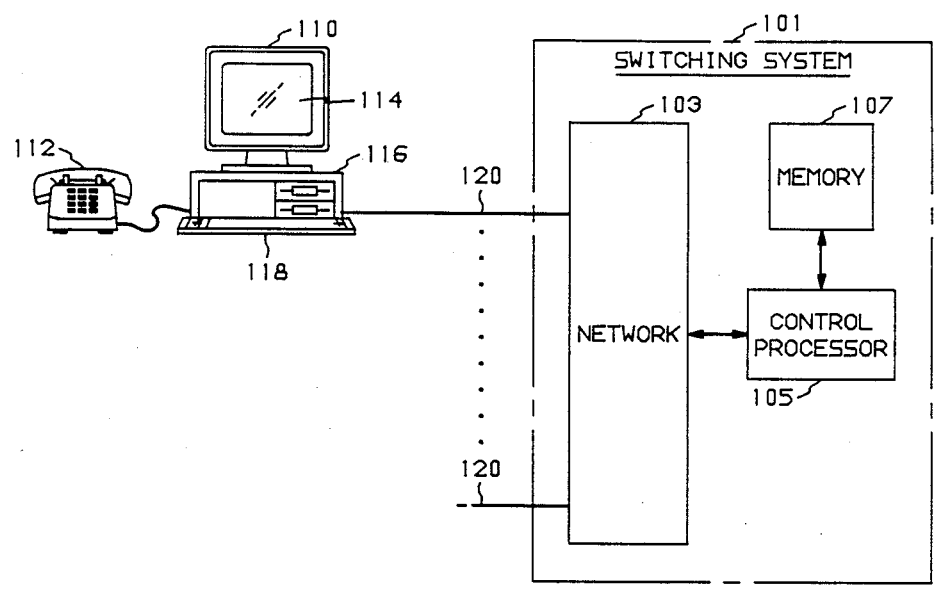
FIG. 1 is a block diagram representation of a telecommunication switching system and a connected touch screen terminal.

FIG. 1 shows an illustrative embodiment of the invention comprising a telecommunication switching system 101 which includes a standard network 103, a control processor 105 and a processor associated memory 107. Connected to the network is a terminal 110 comprising a standard telephone handset 112, a touch screen video display device 114, a standard keyboard 118 and a processor 116. The switching system in this illustrative embodiment is equipped to be compatible with the ISDN (Integrated Services Digital Network) standard requirements as defined by the International Telegraph and Telephone Consultative Committee (CCITT). The ISDN standards call for a digital subscriber line between the network and the terminal consisting of two 64-kbps B-channels transporting voice and/or data, and one 16-kbps D-channel transporting data and signaling. A plurality of such digital subscriber lines are depicted in FIG. 1 by the plurality of lines 120 connected to the network. The specific requirements for ISDN are specified in documents referred to as CCITT ISDN Recommendations which are publicly available. The network 103 represents a switching and interconnection fabric adapted to provide circuit switching and packet switching for the B and D channels as well as circuitry for interfacing with the subscriber lines 120. A switching system incorporating such a network is disclosed in U.S. Pat. No. 4,592,048 entitled "Integrated Packet Switching and Circuit Switching System" of M. W. Beckner, et al. For the purposes of illustrating the invention, the switching system 101 may, for example, be the AT&T 5ESS® switch adapted to be compatible with ISDN. A document published by AT&T and entitled "ISDN Basic Rate Interface Specification" describes in detail the user-network interface between the 5ESS switch and subscriber terminals such as terminal 110.

It is characteristic of ISDN that signaling between a subscriber terminal and a switching system is by means of packetized digital messages transmitted via the D channel. For example, a lifting of the handset at the terminal causes the terminal circuitry to generate a call setup message to the network. Similarly, the network will send a message to the terminal to alert the terminal in case of an incoming call. The entire message protocol between the network and the terminal for the 5ESS switch, for example, is set forth in the above-noted ISDN Basic Rate Interface Specification. The circuitry in the network and in the terminal for carrying out this protocol is not described herein since the circuitry for the terminal and for the network is well known and is commercially available. Hereafter in this document, reference will be made to communications between the terminal and the network and it is understood that all such communications follow the defined protocol.

Figure 2:
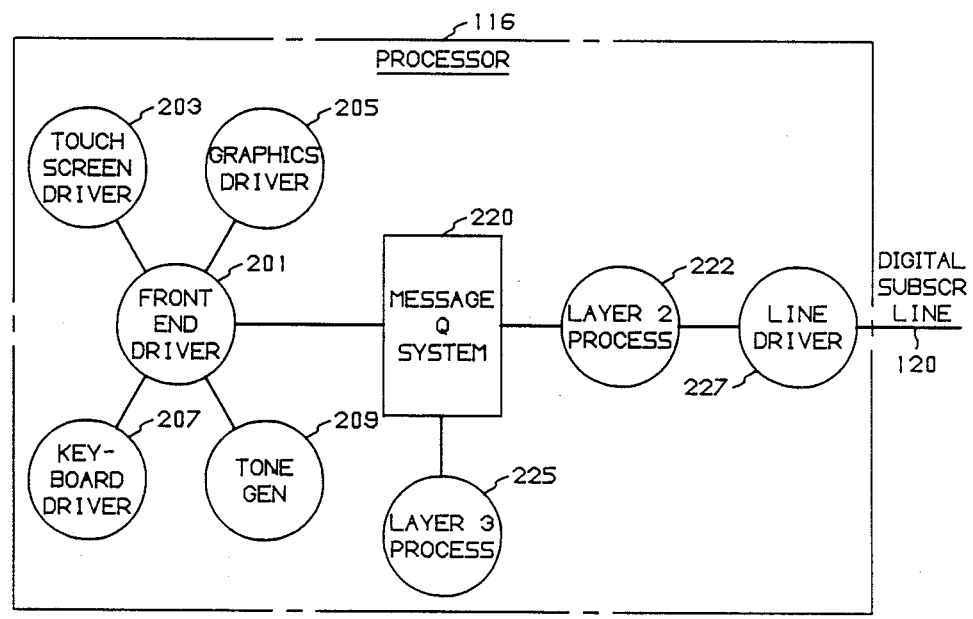
FIG. 2 is a diagrammatic representation of the software architecture of the terminal of FIG. 1.

FIG. 2 shows software architecture for the terminal 110. The processor 116 of the terminal 110 may, for example, be an AT&T PC6300+ personal computer. In this illustrative embodiment, the software system includes a front-end driver 201 which provides a software interface for the various devices of the terminal. This video display monitor 114 is provided with touch screen facility including a controller which transmits signal defining touched coordinates to a touch screen driver 203. The touch screen driver converts the messages from the hardware controller into appropriate touch zones representing key pad numbers, feature buttons, etc. The zone information is passed on to the front end driver module 201. A graphics driver module 205 is called by the front end driver 201 to display the various configurations and labeling on the screen. Module 205 is also used to control illuminated buttons used to display on-hook and off-hook states corresponding to the actual current condition. The terminal 110 had an associated standard keyboard 118 for which a keyboard driver 207 may be provided which appropriately converts keyboard information into information compatible with a front end driver 201. A software package referred to as a tone generator 209 is responsive to the front end driver 201 to provide alerting tone signals to the hardware tone generator internal to the terminal 110. A variety of tones including an alerting tone indicating an incoming call can be generated at the terminal. The various drivers 201, 203, 205, 207, 209 are well known programs and may be obtained commercially. In this illustrative example the MS TM -DOS operating system is used as the front end driver 201 to handle the user interactions. The front end driver 201 also communicates with a message queue system 220. In this illustrative embodiment, the message queue system 220 and a layer 2 process 222 and a layer 3 process 225 as well as a line driver 227 are implemented under a UNIX® operating system. While the MS-DOS operating system is used in interface functions with the various devices of the terminal, the UNIX operating system is used in formatting, validating, transmitting and receiving ISDN messages between the terminal and the network. The message queue 220 is the link between the layer 2 and layer 3 processes and the front end driver 201.

The ISDN protocol between the network and the terminal and defined by CCITT is a multi-layer protocol. Layer 1 specifies the electrical and physical requirements of the physical transmission facilities. Layer 2 is also referred to as a link-layer or Link Access Procedure on the D-Channel (LAPD). This layer defines the frame structure, format of fields contained in the frame, etc., and is used to detect the framing errors and the like. Layer 3 is the layer above the link layer and is used to convey so-called peer-to-peer messages across the user-to-network interface. Layer 3 is referred to as the network layer. The specific messages used in communication between the network and the terminal (i.e., over the digital subscriber line 120) are defined in the previously referenced ISDN basic rate interface specification for the 5ESS switch. The line driver 227 handlers layer 1 formats. The layer 2 process 222 and the layer 3 process 225 perform the layer 2 and 3 functions associated with ISDN message handling, respectively, as defined by CCITT for ISDN terminals.

The line driver 227 transmits and receives messages on the digital subscriber line 120. Incoming ISDN messages are relayed by the line driver to the layer 2 process 222, where corresponding messages are formulated and transmitted to the message queue system 220 for use by the layer 3 process. The layer 3 process 225 will obtain the incoming message from the queue 220, interpret it, and provide corresponding information to the queue 220 designated for the front end driver 201. The front end driver, in turn, will appropriately activate the graphics driver or tone generator. Outgoing messages follow a similar path. For example, an off-hook message from the keyboard driver 207 to the front end driver 201 is relayed to the message queue system 220. Eventually, this message is processed by layer 3 process 225 which generates a corresponding ISDN message indicating the off-hook status. This ISDN message is passed to the message queue 220 for the layer 2 process which prepares the message for transmission over the digital subscriber line and passes the message to the line driver 227 for transmission. The various program processes interactively share system resources as needed. The queue management in the message queue 220 is handled by the UNIX operating system and the processes communicating with the message queue simply use function calls to send or receive the messages.

Figure 3:
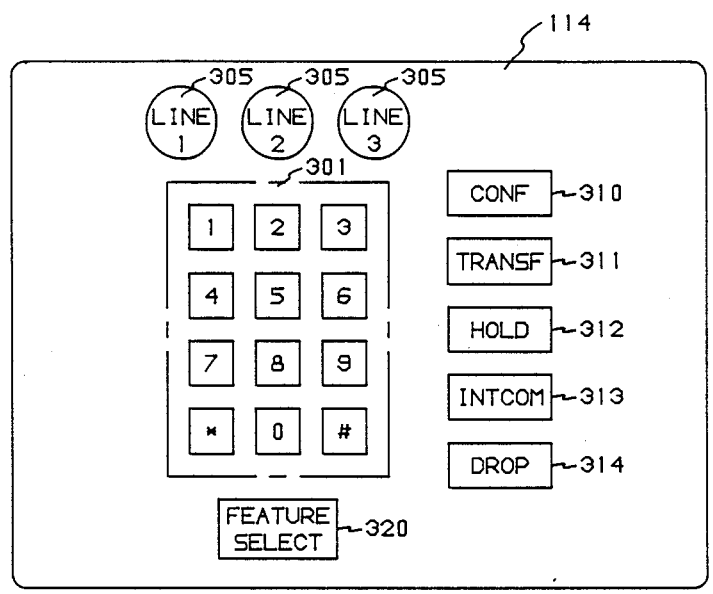
FIG. 3 represents a typical subscriber set display panel on the touch screen terminal of FIG. 1.

FIG. 3 shows a typical screen display upon the touch screen 114. This screen is displayed each time a user lifts the handset 112. Shown is a standard array 301 for push-button dialing in addition to exemplary call-appearance displays 305 which provide an indication of lines activity. Furthermore, the display shows five feature buttons 310 through 314 which indicate an illustrative set of features. A colorgraphics display may be used to show the buttons in different colors and to indicate through a change of color, for example, when a button has been pushed. As indicated earlier, in this illustrative embodiment a touch screen is employed and a touching of a button causes the terminal to take a corresponding action and to send an appropriate ISDN message to the network 101. One button shown on the display is the feature select button 320. The touching of this button results in a message to the switching system 101 requesting the display of available features. In response, the switching system will transmit data messages which are interpreted by the terminal software to display a feature selection menu on the touch screen. Alternatively, the software for the feature selection means may be stored in the terminal and activated to display the screen in response to a touching of the feature select button 320.

Figure 4:
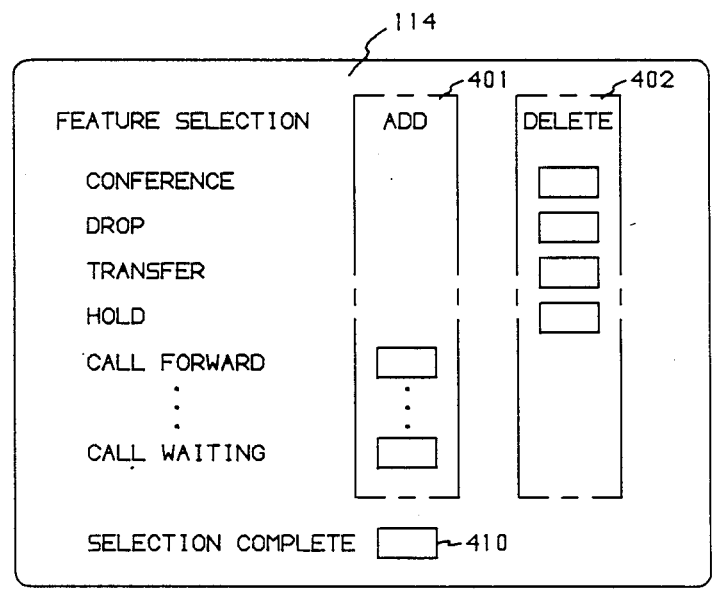
FIG. 4 is a typical feature selection display panel on the touch screen terminal of FIG. 1.

FIG. 4 is an illustrative feature selection display. The display includes two columns of buttons, an add column 401 and a delete column 403. The delete column in this illustrated example shows boxes for each feature which the subscriber currently has and the add column shows boxes for each of the features which are available but unsubscribed. The touching of a box in the delete column will result in a message to the switch that the indicated feature is to be deleted. Similarly, the touching of a box in the add column will result in a message to the switch indicating that the particular feature is to be added to the repertoire of subscribed features for this particular terminal. When a subscriber is finished with the selection process, the "selection complete" box should be touched. It will be understood that any number of different features may be selected which are compatible with the switch and the terminal. The features referred to in this illustrative system, for example in FIGS. 3 and 4 are standard features defined in the afore-noted Basic Rate Interface document.

Figure 5:
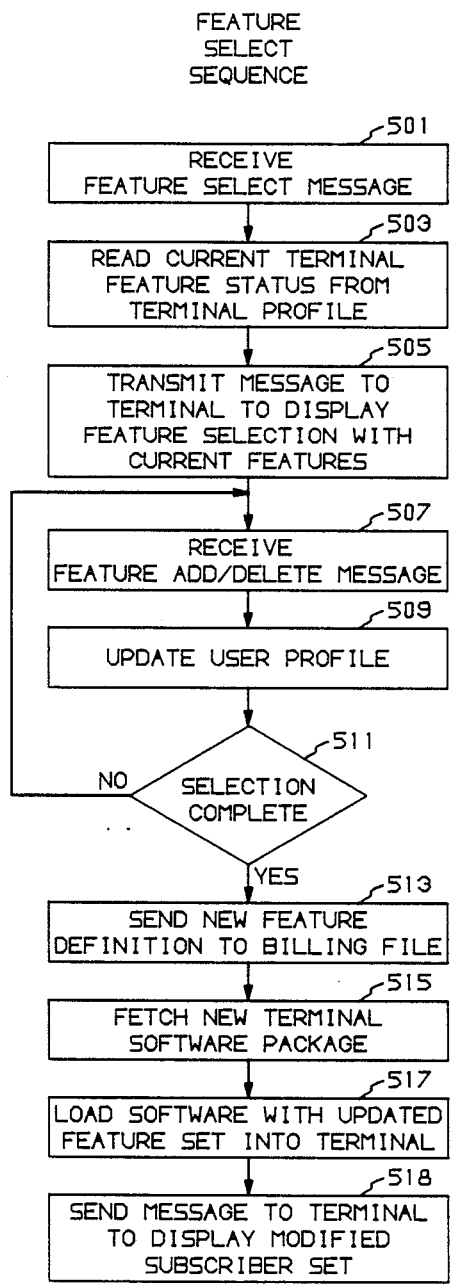
FIG. 5 is a flowchart representation of a feature select sequence performed by the switching system of FIG. 1.

FIG. 5 is a flow chart representation of the feature select sequence which is part of the software switching system control processor 105. When a user presses the feature select touch area 320 of the touch screen 114, a message is sent to the switching system and is transmitted via network 103 to the control processor 105. The control processor may be the AT&T 3B20D processor described in the *Bell System Technical Journal,* Volume 62, Number 1, Part 2 of January, 1983. This is a program controlled processor having programs and data stored, for example, in a memory system 107. As indicated in block 501 of FIG. 5, the control processor receives a feature select message from the subscriber terminal. This message is formatted in accordance with the rules set forth in the ISDN Basic Rate Interface specification. In block 503 the control processor software will read the current terminal feature status from a terminal profile stored in the memory 107. The memory 107 may, by way of example, include a data base system in which the profile information is stored. A unique terminal profile for each terminal will include specific information about the terminal, including the features associated with that terminal. In block 505 the control processor 105 will transmit a display message to the terminal to cause the terminal to display the feature selection panel stored in the terminal. This display panel will include appropriate add boxes with available unsubscribed features and delete boxes with the currently subscribed features. When the user touches an add or delete box on the touch screen, terminal will provide a message to the switch, in a manner described earlier herein, indicating which box was touched. The switch receives these messages, as indicated in box 507, and uses the information to update the user profile in the memory 107, as indicated in box 509. In decision box 511 a test is made to determine whether a message has been received indicating that the selection complete box shown in FIG. 4 has been touched by the user. If not, the system will wait for a further add/delete message and repeat the functions of boxes 507, 509 and 511. When the user touches the selection complete box, an advance is made to block 513 in FIG. 5 to send the new feature definition to a billing file which is maintained by the control processor 105. The billing file may be used in computing charges for the updated feature set of the corresponding terminal.

The software of the terminal must now be modified to reflect the new feature set selected by the subscriber. The control processor 105 stores in its memory system 107 a terminal software package for each combination of features which the user may select. Alternatively, processor 105 may be provided with the capability of assembling software modules to formulate such a package. After the user selection is complete, the control processor fetches a new terminal package defined by the subscriber selection from its memory system, as indicated in block 515. Thereafter, in block 517 the new terminal package reflecting the updated feature set is loaded into the terminal. Thus, if after this event the user wishes to originate a call and lifts the handset, the terminal will display a subscriber set, as in FIG. 3, showing the newly selected features on the feature buttons. To allow the user to view the new subscriber set panel at the end of the feature selection process, a message is transmitted to the terminal in block 518 to cause the terminal to display the modified subscriber set to the user.

It is to be understood that the above-described arrangement is merely illustrative of the principles of the invention; numerous other arrangements may be devised by those skilled in the art without departing from the spirit and scope of the invention.

We claim:

1. A telecommunication switching system for interconnecting a plurality of program controlled subscriber terminals, each assigned a predetermined set of switching system telecommunication features, comprising:
    memory means for storing profile data defining the assigned switching system feature set for each of the terminals;
    control means for controlling the provision of telecommunication services to the plurality of terminals in accordance with the stored profile data, the control means being responsive to a feature change request message from a requesting terminal, to transmit to the requesting terminal a message including profile data representing the assigned feature set for the requesting terminal and responsive to a message from the requesting terminal requesting a specific change in the feature set to modify the profile data in the memory means for the requesting terminal in accordance with the requested change.

2. A telecommunication switching system for interconnecting a plurality of subscriber terminals comprising:
    memory means for storing a plurality of different terminal control software packages each defining terminal functions for a different set of switching system features available to the terminals; and
    a control processor responsive to a request message from a designated terminal specifying a certain set of subscriber features, to transmit to the designated terminal one of said control software packages for controlling the designated terminal to execute terminal functions associated with the specified set of features.

3. A telecommunication switching system comprising:
    a control processor for connection to subscriber stations each operable under control of a software package, said control processor responsive to a feature select message from a requesting subscriber station to transmit to the requesting station data defining a list of features available for subscription to the requesting station together with data defining features to which the requesting station is subscribed, and responsive to a message from the requesting station requesting feature modification to transmit to the requesting station a modified software package for controlling said requesting station to provide a modified feature set to a user of the requesting station.

4. In combination a switching system and subscriber terminal, said terminal comprising:

a touch screen video display responsive to touch to generate output signals identifying touched locations;

and a program controlled processor operable under control of a software package for displaying on said video display locations representing a set of switching system telecommunication service features assigned to said terminal in the switching system;

said processor operative under control of said software package to be responsive to signals from predetermined locations of said touch screen to transmit to said switching system messages indicating requests for telecommunication services defined by switching system features corresponding to touched screen locations;

said touch screen including a request location representing a request to modify the switching system telecommunication feature set assigned to the terminal and said processor being responsive to a touching of said request location to display on said touch screen a list of switching system features available for subscription in the switching system and responsive to a touching of locations of said touch screen corresponding to said displayed available features to transmit to said switching system a request message defining a request for a modified feature set for said terminal;

said switching system comprising means for storing a plurality of different terminal control software packages each defining terminal functions for a different set of switching system telecommunication service features and means responsive to said request message to transfer to said terminal a one of said terminal control software packages defining terminal functions for switching system features defined by said request message for causing said controller to display on said video display screen locations representing features of said modified feature set.

5. In a telecommunication switching system for interconnecting a plurality of subscriber terminals each operable under control of a software package defining predefined subscriber features assigned to the terminal in which the software package resides, the method of modifying a set of subscriber features assigned to a connected terminal, comprising the steps of:

receiving from a designated subscriber terminal a request for a modification of an assigned feature set;

transmitting to the designated subscriber terminal data defining a list of switching system features available for subscription to the requesting terminal together with data defining features to which the requesting terminal is subscribed; and responsive to a message from the designated terminal requesting feature modification, to transmit to the designated terminal software defining the requested modified feature set.

6. A telecommunication switching system for serving a plurality of subscriber terminals, comprising control means responsive to a feature request message from one of said terminals defining subscriber telecommunication features to be provided by the switching system to the terminal user, to transmit to said one terminal a terminal control program for controlling said one terminal to provide to the terminal user subscriber feature capabilities corresponding to features defined by said feature request message.

7. The system in accordance with claim 6, wherein said control means comprises memory means for storing data defining a plurality of subscriber features and is responsive to a feature request message defining a specific subscriber feature to transmit to said requesting terminal a control program for causing said requesting terminal to display a visual indication for said specific subscriber feature.

8. A terminal for use with a switching system comprising:

processor means controlled by a first program package defining terminal actions for a predetermined set of switching system subscriber features for generating processor output signals;

user interface means responsive to user input signals for generating control signals and responsive to processor output signals for displaying data;

said processor means operative under control of said first program package to be responsive to ones of said control signals defining a selected set of switching system subscriber features to transmit a message defining said selected set of switching system subscriber features to a designated switching system and responsive to a message from said designated switching system including a second program package defining terminal actions for said selected set of switching system features to substitute said second program package for said first program package and to generate processor output signals for controlling and interface means to display data indicative of said selected set of subscriber features.

9. A terminal in accordance with claim 8, wherein said interface means comprises a screen for displaying graphical indications representative of said subscribed features and is responsive to a user input designating one of said displayed indications to generate control signals identifying said designated indications; and wherein said processor is responsive to said control signals identifying said designated indication to transmit to said designated switching system a message identifying said designated indication.

10. A terminal in accordance with claim 9 wherein said displayed indications include graphically defined areas on said screen displaying data defining specific subscriber features and the screen is responsive to a user input designating one of said areas to generate control signals identifying the designated area, and said processor is responsive to said control signals identifying the designated area to transmit a message identifying the designated area to the designated switching system.

11. A terminal in accordance with claim 10 wherein said screen comprises a touch screen displaying areas representative of buttons on a subscriber telephone set and said user input designation comprises a touching of one of said areas representative of buttons.

12. A terminal for use with a switching system, comprising:

processor means operative under control of a control program for controlling said terminal to transmit to said switching system telecommunication signals corresponding to a first set of switching system telecommunication features, user interface means including means responsive to a user indicating a user request for a switching system telecommunication feature selection, said terminal responsive to a user request for a switching system feature selection to display a screen showing features available for selection and responsive to an indication of a request for a specific set of features to transmit to said switching system a message defining said specific set and further responsive to a message from said switching system defining a new control program for controlling said terminal to transmit to said switching system telecommunication signals corresponding to a second set of switching system telecommunication features defined by said new control program.

13. In a telecommunication system comprising a switching system and a plurality of terminals, the method of providing modified feature sets to subscribers comprising the steps of:

transmitting from one of said terminals to said switching system a message requesting modification of subscriber features;

transmitting from said switching system to said one of said terminals a list of switching system telecommunication features available for subscription;

in response to signals evidencing selection of a set of switching system features from said list, transmitting to said switching system a message defining said selected set of features; and in response to said message, transmitting from said switching system to said one terminal control a software package for controlling said one terminal to execute terminal functions associated with the selected set of features.

14. The method in accordance with claim 13, wherein said switching system stores feature data defining a feature set for said one terminal and comprising the further step of:

modifying said feature data in response to said message to reflect the requested modification.

* * * * *